(12) United States Patent
Davey

(10) Patent No.: US 7,547,428 B2
(45) Date of Patent: Jun. 16, 2009

(54) METHOD FOR PRODUCING AMMONIA FROM METHANOL

(75) Inventor: William Davey, Frankfurt (DE)

(73) Assignee: MG Technologies AG, Frankfurt am Main (DE)

(*) Notice: Subject to any disclaimer, the term of this patent is extended or adjusted under 35 U.S.C. 154(b) by 928 days.

(21) Appl. No.: 10/473,320

(22) PCT Filed: Feb. 26, 2002

(86) PCT No.: PCT/EP02/02008

§ 371 (c)(1),
(2), (4) Date: Mar. 15, 2004

(87) PCT Pub. No.: WO02/079083

PCT Pub. Date: Oct. 10, 2002

(65) Prior Publication Data

US 2004/0161377 A1  Aug. 19, 2004

(30) Foreign Application Priority Data

Mar. 31, 2001  (DE) .............................. 101 16 152

(51) Int. Cl.
*C01C 1/04* (2006.01)
*C01B 3/22* (2006.01)
*C07C 273/04* (2006.01)

(52) U.S. Cl. .............. 423/359; 252/375; 423/360; 564/69

(58) Field of Classification Search ............... 423/359, 423/360; 252/375; 564/69
See application file for complete search history.

(56) References Cited

U.S. PATENT DOCUMENTS

2002/0098132 A1* 7/2002 Vidalin ...................... 422/188
2003/0099593 A1* 5/2003 Cortright et al. ......... 423/648.1

FOREIGN PATENT DOCUMENTS

DE        20 07 441        9/1971

(Continued)

OTHER PUBLICATIONS

Ullmann's Encyclopedia of Industrial Chemistry, 5$^{th}$ edition, vol. A2, pp. 143-215.
Ullmann's Encyclopedia of Industrial Chemistry, 5$^{th}$ edition, vol. A27, pp. 333-350.

(Continued)

*Primary Examiner*—Wayne Langel
(74) *Attorney, Agent, or Firm*—Norris McLaughlin & Marcus PA

(57) ABSTRACT

Ammonia is catalytically produced from a nitrogen-hydrogen mixture. First of all, a vaporous feed mixture, which comprises 30 to 60 vol-% methanol and 40 to 70 vol-% steam and has a volume ratio steam:methanol of 1 to 3, is passed through at least one bed of a breakdown catalyst at pressures in the range from 30 to 200 bar, the temperatures in the catalyst bed lying in the range from 200 to 500° C. From the catalyst bed, a first gas mixture is withdrawn, which, calculated dry, comprises 40 to 80 vol-% $H_2$ and 10 to 30 vol-% $CO_2$. The first gas mixture is cooled, $CO_2$ is removed in a gas cleaning, and a second gas mixture is generated, which comprises at least 95 vol-% nitrogen and hydrogen, and which is supplied as synthesis gas to an ammonia synthesis for the catalytic production of ammonia.

6 Claims, 1 Drawing Sheet

FOREIGN PATENT DOCUMENTS

| | | |
|---|---|---|
| EP | 0 303 032 | 2/1989 |
| EP | 0 307 983 A1 | 3/1989 |
| EP | 0 311 932 A1 | 4/1989 |
| EP | 0 931 762 A1 | 7/1999 |

OTHER PUBLICATIONS

Patent Abstracts of Japan, vol. 015, No. 457 (M-1181) Nov. 20, 1991 & JP 03 194111 A (Shinnenshiyou Syst Kenkyusho:KK) Aug. 23, 1991.

\* cited by examiner

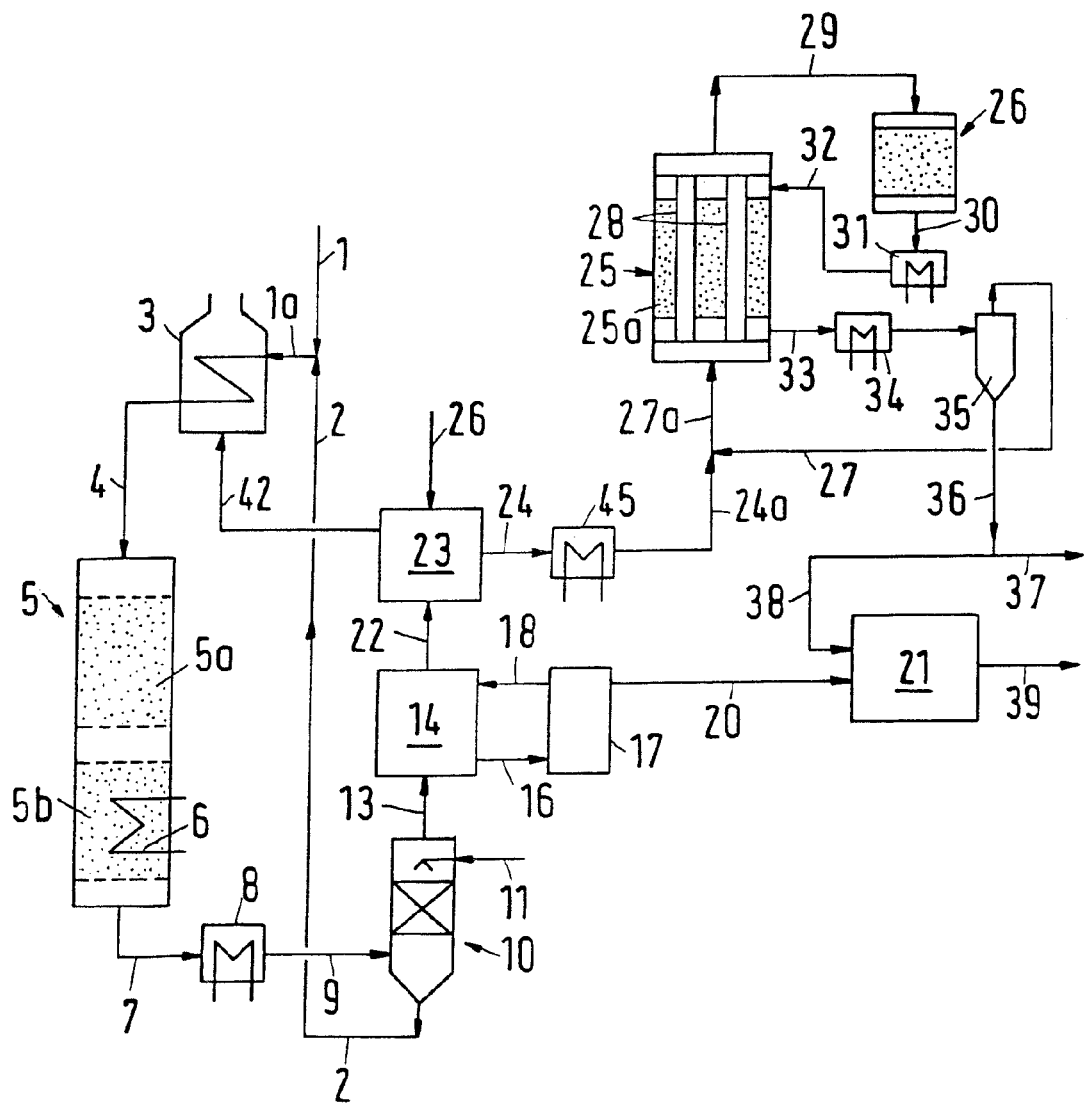
Figure

METHOD FOR PRODUCING AMMONIA FROM METHANOL

This is a 371 of PCT/EP02/02008 filed Feb. 26, 2002 (international filing date).

This invention relates to a process for the catalytic production of ammonia from a nitrogen-hydrogen mixture by subjecting a vaporous feed mixture of methanol and steam under pressure to an endothermal gasification over catalysts, cooling the gas mixture of $H_2$ and $CO_2$, which was formed thereby, removing $CO_2$ from the gas, mixture, and passing on $H_2$ for the production of synthesis gas for the synthesis of ammonia.

BACKGROUND OF THE INVENTION

From German Patent 20 07 441 the generation of an ammonia synthesis gas is known, where by gasifying hydrocarbons a raw gas is generated, which is desulfurized, converted, liberated from $CO_2$ and finally subjected to washing with liquid nitrogen for removing residual impurities. In EP patent 0 307 983 a similar process is described, wherein prior to the synthesis of ammonia converted synthesis gas is subjected to washing with liquid nitrogen. Details of the catalytic production of ammonia can be found in Ullmann's Encyclopedia of Industrial Chemistry, 5th edition, vol. A2, pp. 143-215; the production of urea is described there in vol. A 27, pp. 333-350.

Subject-matter of EP 0 931 762 A is a process of producing gas rich in hydrogen from dimethyl ether and/or methanol by adiabatic catalytic steam reforming in an oxygen-containing atmosphere. The heat necessary for the endothermal steam reforming reactions is generated by oxidizing part of the hydrogen obtained from the feed mixture treated by steam reforming. The product gas is supplied to an ammonia synthesis, where it is possible to remove the carbon dioxide from the product gas and use the same for the synthesis of urea. This process is not much suited for generating hydrogen as starting product for the large-scale production of ammonia, as temperatures of the gas mixture generated by steam reforming, which are decisive for the size of the yield of hydrogen, cannot be controlled with sufficient accuracy.

It is the object underlying the invention to treat a vaporous feed mixture of methanol and steam by means of endothermal gasification such that a gas mixture with a predominant content of hydrogen as compared to carbon dioxide can be produced, in order to be able to produce ammonia on an industrial scale.

SUMMARY OF THE INVENTION

In accordance with the invention this is achieved in that a feed mixture which comprises 30-60 vol-% methanol and 40-70 vol-% steam and has been heated to a temperature of 200-500° C. is passed through at least one bed of a breakdown catalyst in a volume ratio of steam to methanol of 1-3 at a pressure of 30-200 bar, and the gas mixture discharged therefrom with a temperature of 200-350° C. is passed through at least one bed of a breakdown catalyst indirectly heated by means of a heating fluid, the gas mixture withdrawn therefrom, which, calculated dry, comprises 40-80 vol-% $H_2$ and 10-30 Vol-% $CO_2$, is cooled, thereafter $CO_2$ is removed from the gas mixture in a gas cleaning, and subsequently a gas mixture comprising at least 95 vol-% nitrogen and hydrogen is generated, which is supplied as synthesis gas to an ammonia synthesis for the catalytic production of ammonia. In this process, the carbon-containing components of the feed mixture should expediently comprise 80-100 vol-% methanol.

The ammonia synthesis may comprise one or several stages; one of the possible variants consists in that in the ammonia synthesis the synthesis gas is passed through at least two catalyst-containing reactors, where in one reactor the synthesis gas is used as cooling medium for indirectly cooling the catalyst.

One embodiment of the invention consists in that the ammonia generated in the ammonia synthesis is at least partly converted to urea by reaction with $CO_2$. Expediently, the $CO_2$ removed in the gas cleaning is at least partly recovered and used for producing urea.

The reaction of the feed mixture at the breakdown catalyst is an endothermal process, where chiefly the following reactions take place:

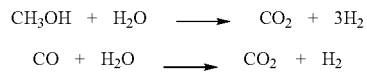

For the gas cleaning of the gas mixture various methods known per se can be employed and also be combined with each other. One possibility is to remove the $CO_2$ in the gas cleaning by physically washing with methanol at temperatures in the range from −20 to −70° C. The removal of $CO_2$ can, however, also be effected by pressure-swing absorption; furthermore, pressure-swing adsorption for the removal of $CO_2$ can also be performed before physically washing with methanol.

When $CO_2$ has been removed from the gas mixture, a fine cleaning is recommended. This fine cleaning can for instance be effected by washing with liquid nitrogen, and a second gas mixture is withdrawn therefrom, which substantially consists of $H_2$ and $N_2$ and can be supplied to the ammonia synthesis as synthesis gas. Upon removal of $CO_2$, the first gas mixture is alternatively passed through a catalytic methanization in which CO is reacted with $H_2$ to obtain $CH_4$. Residual $CO_2$ is also reacted to obtain methane.

BRIEF DESCRIPTION OF THE DRAWINGS

Embodiments of the process will be explained with reference to the drawing. The drawing shows a flow diagram of the process.

Methanol, which usually has a pressure of 30 to 200 bar and preferably at least 100 bar, is supplied via line (1) and mixed with water from line (2). Via line (1a), the mixture is supplied to a fired heater (3), and in line (4) there is obtained a vaporous feed mixture with temperatures in the range from 200 to 500° C. and preferably at least 300° C., which is charged into a gasification reactor (5). The reactor (5) includes two beds (5a and 5b) with breakdown catalysts, which in the upper bed (5a) may be a Zn—Cr catalyst and in the lower bed (5b) a Cu—Zn breakdown catalyst. The mixture coming from the upper bed (5a) enters the lower bed (5b) usually with temperatures of 200 to 350° C. and preferably at least 250° C. In the present case, a heating (6) by indirect heat exchange by means of a heating fluid is provided in the lower bed.

The first gas mixture leaving the gasification reactor (5) via line (7) chiefly comprises $H_2$ and $CO_2$, it furthermore contains CO, $CH_4$ and methanol as well as possibly small amounts of further impurities. This gas mixture is first of all cooled in a heat exchanger (8) and then supplied through line (9) to a washing column (10), in which it is cooled in a countercurrent flow with water sprayed in from line (11). What condenses above all is methanol, which together with the used washing water is discharged via line (2).

The washed gas is then supplied through line (13) to a gas washing plant (14), to in particular remove $CO_2$. This may be effected for instance by physically washing with methanol at temperatures in the range from about −70 to −20° C.; another possibility is e.g. washing by means of methyldiethylamine or selexol washing. Used, $CO_2$-containing washing solution is withdrawn via line (16) and charged into a regeneration (17), in order to remove $CO_2$ from the washing solution. Regenerated washing solution is recirculated to the gas washing plant (14) via line (18). The $CO_2$ obtained is very well suited for being supplied through line (20) to a urea synthesis (21). The amount of $CO_2$ obtained usually is sufficient for converting the entire ammonia produced into urea.

Partly cleaned synthesis gas is withdrawn from the gas washing plant (14) via line (22) and is treated in a second washing plant (23), where liquid nitrogen is used as washing liquid. The required nitrogen comes e.g. from an air-separation plant and is supplied via line (26). Details of washing with liquid nitrogen for generating an $NH_3$ synthesis gas can be found in EP patent 0307983, which has already been mentioned above. In the washing plant (23), there is usually obtained an exhaust gas containing CO and $CH_4$, which through line (42) is supplied as fuel to the heater (3).

Washing (23) is performed such that the synthesis gas obtained in line (24) already has a molar ratio $H_2N_2$ of about 3:1. This synthesis gas is heated in the indirect heat exchanger (45) and flows through line (24a) to an ammonia synthesis, to which belong the indirectly cooled reactor (25) and the adiabatically operated reactor (26). Circulating synthesis gas from line (27) together with fresh synthesis gas of line (24a) enters the reactor (25) through line (27a) with temperatures in the range from 100 to 200° C., in which reactor it flows through tubes (28) or passages, the gas serving as cooling medium and dissipating heat from the catalyst bed (25a).

The synthesis gas leaves the reactor (25) via line (29) with temperatures in the range from 300 to 500° C., and in the reactor (26) it gets in contact with the catalyst thereof, which forms a bed. The $NH_3$-forming reaction is an exothermal reaction, so that the mixture flowing off via line (30) has temperatures of 400 to 600° C. and is passed through a cooler (31). Subsequently, the $NH_3$-containing synthesis gas coming from line (32) enters the reactor (25) and flows through the indirectly cooled catalyst bed thereof. The outlet temperature in line (33) lies in the range from 300 to 500° C. and preferably 380 to 430° C. The product mixture in line (33) has an $NH_3$ concentration of at least 20 vol-%; in addition, it chiefly contains $N_2$ and $H_2$. This mixture is subjected to a multi-stage cooling (34) and finally reaches a separator (35), from which $NH_3$ is withdrawn through line (36) in liquid form. The gaseous components are withdrawn via line (27) and are recirculated as recycle gas.

The $NH_3$ produced can wholly or partly be removed through line (37) and be supplied to a use known per se. Furthermore, the $NH_3$ may wholly or partly be supplied through line (38) to a urea synthesis, which is known per se. Urea produced is withdrawn via line (39).

EXAMPLE

In a procedure corresponding to the drawing, 42 t methanol are processed per hour to obtain 41.7 t ammonia. The subsequent table indicates the flow rates (t/h), the gas compositions (vol-%) as well as temperature and pressure in various lines. The data are calculated in part.

| Line | 4 | 9 | 13 | 24a | 27a | 33 |
|---|---|---|---|---|---|---|
| Flow rate | 138 | 138 | 63 | 42 | 127 | 127 |
| Temp. (° C.) | 350 | 250 | 30 | 32 | 175 | 403 |
| Pressure (bar) | 149 | 148 | 146 | 143 | 143 | 140 |
| Composition: | | | | | | |
| $CO_2$ | 0.8 | 14.9 | 24.4 | — | — | — |
| CO | — | 0.4 | 0.7 | — | — | — |
| $N_2$ | — | — | — | 25.2 | 24.4 | 19.0 |
| $H_2O$ | 66.2 | 32.2 | 0.1 | — | — | — |
| $NH_3$ | — | — | — | — | 4.8 | 27.0 |
| $CH_3OH$ | 33.0 | 8.5 | — | — | — | — |
| $H_2$ | — | 44.0 | 74.8 | 74.8 | 70.8 | 54.0 |

The catalyst of the upper bed (5a) chiefly consists of Zn and Cr, and the catalyst of the lower bed (5b) chiefly consists of Cu and Zn. The catalysts of the ammonia synthesis are commercially available (manufacturer e.g. Süd-Chemie, München (Germany), Type G-90 and AS-4). The gas washing (14) employs methanol as washing liquid, and the temperature in the washing zone is about −58° C. Fine cleaning is effected by washing with liquid nitrogen in accordance with EP patent 0307983. In line (20), 54 t/h $CO_2$ are obtained, which is virtually pure and can be used for a urea synthesis.

I claim:

1. A process for the catalytic production of ammonia from a nitrogen-hydrogen mixture, wherein a vaporous feed mixture, which is comprised of 30-60 vol-% methanol and 40-70 vol-% steam is passed through a gasification reactor having two separate beds of breakdown catalyst, in the form of an upper bed and a lower bed, at pressures in the range from 30-200 bar and temperatures in the range from 200-500° C. in the catalyst beds; the lower catalyst bed being provided with heating by indirect heat exchange with a heating fluid, wherein a first gas mixture comprising 40-80 vol % $H_2$ and 10-30 vol % $CO_2$ is withdrawn from the gassification reactor, and is cooled in a heat exchanger and then supplied to a washing column where it is washed and cooled with water to condense and remove methanol, then the washed gas is supplied to a washing plant for removing $CO_2$ by washing with methanol at temperatures in the range of from about −20° C. to −70° C. and upon removal of $CO_2$ the washed gas is further washed with liquid nitrogen to obtain an exhaust gas containing carbon monoxide and methane and to supply nitrogen and form a gas mixture comprising at least 95 vol-% nitrogen and hydrogen and having a molar ratio of hydrogen to nitrogen of about 3:1, which is then supplied as synthesis gas to an ammonia synthesis for the catalytic production of ammonia.

2. The process as claimed in claim 1, wherein the ammonia generated in the ammonia synthesis is at least partly converted to urea by reaction with $CO_2$.

3. The process as claimed in claim 1 wherein the $CO_2$ removed in the gas cleaning is at least partly recovered and used for producing urea.

4. The process as claimed in claim 1, wherein upon removal of $CO_2$ the first gas mixture is passed through a methanization, in which CO is reacted with $H_2$ to obtain $CH_4$.

5. The process as claimed in claim 1, wherein in the gas cleaning $CO_2$ is removed by pressure-swing adsorption.

6. The process as claimed in claim 1 wherein synthesis gas is passed through at least two catalyst-containing reactors, where in one of said reactors the synthesis gas is used as cooling medium for indirectly cooling the catalyst.

* * * * *